US009438923B2

United States Patent
He et al.

(10) Patent No.: US 9,438,923 B2
(45) Date of Patent: Sep. 6, 2016

(54) APPARATUS AND METHOD TO SUPPORT ENCODING AND DECODING VIDEO DATA

(71) Applicant: BlackBerry Limited, Waterloo (CA)

(72) Inventors: Dake He, Waterloo (CA); Gaëlle Christine Martin-Cocher, Toronto (CA)

(73) Assignee: BlackBerry Limited, Waterloo, Ontario (CA)

(*) Notice: Subject to any disclaimer, the term of this patent is extended or adjusted under 35 U.S.C. 154(b) by 163 days.

(21) Appl. No.: 14/296,901

(22) Filed: Jun. 5, 2014

(65) Prior Publication Data

US 2015/0358634 A1    Dec. 10, 2015

(51) Int. Cl.
*H04N 19/50* (2014.01)
*H04N 19/103* (2014.01)
*H04N 19/176* (2014.01)

(52) U.S. Cl.
CPC ............ *H04N 19/50* (2014.11); *H04N 19/103* (2014.11); *H04N 19/176* (2014.11)

(58) Field of Classification Search
CPC ... H04N 19/50; H04N 19/103; H04N 19/176
USPC ................................................... 375/240.12
See application file for complete search history.

(56) References Cited

PUBLICATIONS

Ye et al., "Improved H.264 Intra Coding Based on Bi-directional Prediction, Directional Transform, and Adaptive Coefficient Scanning", pp. 2116-2119, ICIP 2008.*

Lai, Changcai et al.; "New Intra Prediction Using the Correlation Between Pixels and Lines," Joint Collaborative Team on Video Coding (JCT-VC) of ITU-T SG16 WP3 and ISO/IEC JTC1/SC29/WG11; 2nd Meeting: Geneva, CH, Jul. 21-28, 2010; 4 pages.

Tanizawa, Akiyuki et al.; "Improvement of Intra Coding by Bidirectional Intra Prediction and 1 Dimensional Directional Unified Transform," Joint Collaborative Team on Video Coding (JCT-VC) of ITU-T SG16 WP3 and ISO/IEC JTC1/SC29WG11; 2nd Meeting: Geneva, CH, Jul. 21-28, 2010; 5 pages.

Zhang, Kai et al.; "TE6.a: Overlapped Block Intra Prediction," Joint Collaborative Team on Video Coding (JCT-VC) of ITU-T SG16 WP3 and ISO/IEC JTC1/SC29/WG11; 3rd Meeting: Guangzhou, CN, Oct. 7-15, 2010; 5 pages.

Matsuo, Shohei et al.; "Intra Angular Prediction Blending," Joint Collaborative Team on Video Coding (JCT-VC) of ITU-T SG16 WP3 and ISO/IEC JTC1/SC29/WG11; 11th Meeting: Shanghai, CN, Oct. 10-19, 2012; 5 pages.

(Continued)

*Primary Examiner* — Hee-Yong Kim
(74) *Attorney, Agent, or Firm* — Jon Gibbons; Fleit Gibbons Gutman Bongini & Bianco P.L.

(57) ABSTRACT

To support encoding a control circuit determines a primary prediction mode to employ when encoding a block of video data and then determines a corresponding companion prediction mode to correspond to the primary prediction mode. The control circuit can then generate a mixed prediction for the block of video data by mixing a prediction formed using the primary prediction mode with a prediction formed using the companion prediction mode. By one approach the control circuit determines the corresponding companion prediction mode by accessing a companion prediction mode lookup table. In such a case, if desired, upon generating the mixed prediction for the block of video data the control circuit can also automatically update the companion prediction mode lookup table. By one approach a corresponding decoder infers the employed companion prediction mode (or modes).

18 Claims, 2 Drawing Sheets

(56) References Cited

PUBLICATIONS

Shiodera, Taichiro et al.; "CE6 Subset A: Bidirectional Intra Prediction," Joint Collaborative Team on Video Coding (JCT-VC) of ITU-T SG16 WP3 and ISO/IEC JTC1/SC29/WG11; 4th Meeting: Daegu, KR, Jan. 20-28, 2011; 13 pages.

Series H: Audiovisual and Multimedia Systems Infrastructure of audiovisual services—Coding of moving video; High efficiency video coding; ITU-T H.265 Telecommunication Standardization Sector of ITU (International Telecommunication Union); Apr. 2013; 317 pages.

Series H: Audiovisual and Multimedia Systems Infrastructure of audiovisual services—Coding of moving video; Advanced video coding for generic audiovisual services; ITU-T H.264 telecommunication Standardization Sector of ITU (International Telecommunication Union); Feb. 2014; 801 pages.

* cited by examiner

APPARATUS AND METHOD TO SUPPORT ENCODING AND DECODING VIDEO DATA

FIELD OF TECHNOLOGY

The present disclosure relates generally to the coding and encoding of video data and more particularly to the use of a primary prediction mode.

BACKGROUND

Video encoding and decoding is known in the art. Some video coding and decoding formats employ a technique known as intra-prediction which often relies upon a so-called minimum description length (MDL) principle. The intra-prediction technique often employs two stages: selecting a prediction mode (from amongst a plurality of candidate prediction modes) and then applying the selected prediction mode. The intra-prediction technique serves to minimize a total description length that includes a description length of the selected prediction mode and a description length of residuals resulting from using the selected prediction mode. The Advanced Video Coding (AVC) video compression standard (a block-oriented motion-compensation-based codec standard developed by the ITU-T Video Coding Experts Group (VCEG) together with the ISO/IEC Moving Picture Experts Group (MPEG)) and the High Efficiency Video Coding (HEVC) video compression standard (that was jointly developed by the ISO/IEC Moving Picture Experts Group and ITU-T Video Coding Experts Group as ISO/IEC 23008-2 MPEG-H Part 2 and ITU-T H.265) are examples of video coding standards that utilize intra-prediction.

The MDL principle minimization step provides a sound mechanism against over-fitting. A brute-force implementation of the minimization step, however, necessitates examining all possible prediction modes and determining the associated coding cost for each of these modes. When the number of available modes is large (35 in HEVC, for example), the computational complexity involved can be excessive. Furthermore, in order to further improve rate distortion performance, a straightforward method is to define even more intra-prediction modes while leveraging MDL to take advantage of these additional modes. Such benefits are currently only attained, however, by also increasing even further the computational overhead that accompanies the additional modes.

DETAILED DESCRIPTION

Figure 1:
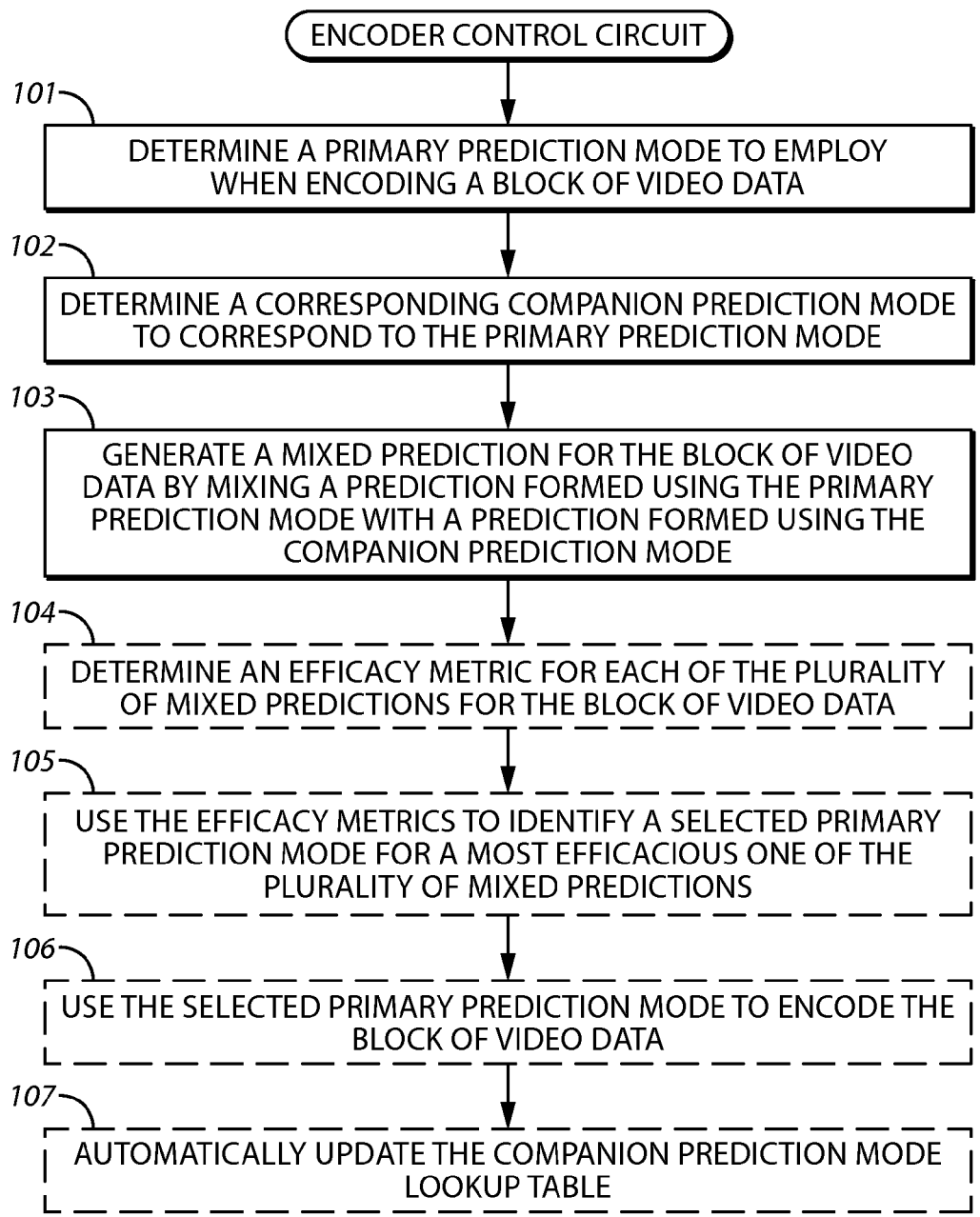
FIG. 1 is a flow diagram in accordance with the disclosure.

The following describes an apparatus and method pertaining to an apparatus and method to support encoding and decoding video data. To support encoding a control circuit is configured to determine a primary prediction mode to employ when encoding the block of video data and to then determine a corresponding companion prediction mode to correspond to the primary prediction mode. The control circuit can then generate a mixed prediction for the block of video data by mixing a prediction formed using the primary prediction mode with a prediction formed using the companion prediction mode. By one approach the control circuit determines the corresponding companion prediction mode by accessing a companion prediction mode lookup table. In such a case, if desired, upon generating the mixed prediction for the block of video data the control circuit can also automatically update the companion prediction mode lookup table.

By another approach, in lieu of the foregoing or in combination therewith, given ones of the companion prediction modes correspond to given ones of the primary prediction modes as a function, at least in part, of accuracy maps for each of the given companion prediction mode and primary prediction mode, wherein each of the accuracy maps identify at what block positions a prediction mode performs well and at what block positions the prediction mode performs poorly.

By yet another approach, the control circuit generates a plurality of mixed predictions for the block of video data by mixing each of a plurality of predictions formed using a corresponding plurality of different primary prediction modes with corresponding predictions formed using corresponding companion prediction modes. If desired, the control circuit may then determine an efficacy metric (such as, but not limited to, a metric regarding rate distortion cost) for each of the plurality of mixed predictions for the block of video data and use those efficacy metrics to identify a selected primary prediction mode for a most efficacious one of the plurality of mixed predictions. The control circuit can then use the selected primary prediction mode to encode the block of video data.

To support encoding a block of video data, a control circuit is configured to determine a primary prediction mode to employ when decoding the block of encoded video data and to then infer at least one corresponding companion prediction mode from a lookup table to correspond to the primary prediction mode. The control circuit can then generate a mixed prediction for the block of encoded video data by mixing a prediction formed using the primary prediction mode with a prediction formed using the at least one companion prediction mode. Following the generation of the mixed prediction for the block of encoded video data the control circuit can then automatically update the companion prediction mode lookup table.

By one approach the aforementioned lookup tables contain weighting parameters associated to a combination of a primary prediction mode with at least one companion prediction mode. Those weighting parameters can more particularly correspond to the combination of an accuracy map for the primary prediction mode and an accuracy map for the at least one companion prediction mode.

By one approach the aforementioned automatic update of the companion prediction mode lookup table occurs in response to an instruction in a received bitstream that includes the block of encoded video data. By another approach, in lieu of the foregoing or in combination therewith, the automatic update occurs at least in part as a function of a decoded version of the block of encoded video data. And by yet another approach, the automatic update occurs as based on accuracy maps wherein each of the accuracy maps quantifies accuracy of each prediction mode at each position in the block.

So configured, these teachings improve intra-prediction results via mixing. By one approach the mixing coefficients are mode and/or position dependent. In some cases these position-dependent mixing coefficients may be static for a part of the picture or they may be adaptive (in that they are learned from a previously decoded part of the picture).

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Figure 2:
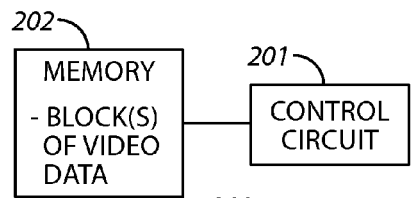
FIG. 2 is a block diagram in accordance with the disclosure.

FIG. 1 presents a process 100 that accords with many of these teachings. By one approach an encoder control circuit of choice carries out these specified activities. With momentary reference to FIG. 2, an illustrative example of a suitable encoder 200 includes a control circuit 201 that operably couples to a memory 202. Such a control circuit 201 can comprise a fixed-purpose hard-wired platform or can comprise a partially or wholly programmable platform. Some useful examples in these regards include using a Central Processing Unit (CPU) as the control circuit, using a Graphics Processing Unit (GPU) as the control circuit, or using both a CPU and a GPU in tandem with one another as the control circuit by allocating various portions of the encoder activity amongst such components. These architectural options are well known and understood in the art and require no further description here. This control circuit 201 is configured (for example, by using corresponding programming as will be well understood by those skilled in the art) to carry out one or more of the steps, actions, and/or functions described herein.

The memory 202 may be integral to the control circuit 201 or can be physically discrete (in whole or in part) from the control circuit 201 as desired. This memory 202 can also be local with respect to the control circuit 201 (where, for example, both share a common circuit board, chassis, power supply, and/or housing) or can be partially or wholly remote with respect to the control circuit 201 (where, for example, the memory 202 is physically located in another facility, metropolitan area, or even country as compared to the control circuit 201).

This memory 202 can serve, for example, to non-transitorily store the computer instructions that, when executed by the control circuit 201, cause the control circuit 201 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

In this illustrative example the memory 202 also stores a block of video data to be encoded. (It will be understood that in a typical application setting the memory 202 will store a plurality of blocks that each correspond to an item of video content.)

Referring again to FIG. 1, at block 101 the control circuit 201 determines a primary prediction mode to employ when encoding a block of video data (such as the block of video data stored in the aforementioned memory 200. As used herein, it will be understood that the expression "primary prediction mode" refers to the intra-prediction mode derived for a block to be predicted as per the International Telecommunication Union-Telecommunication Standardization Sector (ITU-T) H.264 video compression format (sometimes referred to as Advanced Video Coding (AVC)) (the ITU-T H.264 standard and the ISO/IEC MPEG-4 AVC standard are jointly maintained so that they have identical technical content) or the ITU-T H.265 video compression format (sometimes referred to as High Efficiency Video Coding (HEVC)) (the ITU-T H.265 standard and the ISO/IEC 23008-2 MPEG-H Part 2 standard are also jointly maintained so that they have identical technical content).

The control circuit 201 will typically have a plurality of primary prediction modes from which the particular selection is made. For example, H.264 typically offers (for a 4×4 block) nine intra-prediction modes that can serve in these regards including a DC prediction mode and 8 directional prediction modes. In H.265 the available intra-prediction modes include planar, DC, and 33 directional prediction modes. It will be understood that the present teachings are not limited to only these primary prediction modes.

At block 102 the control circuit 201 then determines a corresponding companion prediction mode to correspond to the primary prediction mode determined pursuant to the activity specified at block 101. Generally speaking, a companion prediction mode comprises one or more intra-prediction modes that can be used for the block to be predicted and that is mixed with a primary prediction mode to generate better prediction accuracy. More particularly, a useful companion prediction mode offers strengths that help to supplant weaknesses of the corresponding primary prediction mode (and very typically vice versa).

By one approach, the control circuit 201 identifies the companion prediction mode by accessing a companion prediction mode lookup table (stored, for example, in the aforementioned memory 202). Such a lookup table can specifically correlate particular primary prediction modes with one or more corresponding particular companion prediction modes. By one approach, and as described below in more detail, the control circuit 201 can make this determination, at least in part, by inferring the companion prediction mode from such a lookup table.

By one approach suitable companion prediction modes for each (or at least many) of the available primary prediction modes are determined based as a function, at least in part, on accuracy maps for each such mode. Generally stated, these accuracy maps can each identify at what block positions a prediction mode performs well and at what block positions the prediction mode performs poorly.

To state this another way, the accuracy map of a given prediction mode i indicates how well that prediction mode does at all block positions. More specifically, the accuracy map of this prediction mode i can be described by an N×N matrix $A_i$ of non-negative real numbers such that $A_i(j,k)$ quantifies the accuracy of the prediction mode at position (j, k). An example of $A_i(j,k)$ can be the average energy of the prediction residuals at position (j, k) resulting from using the prediction mode i on a set of pictures or a region of a picture. Another example of $A_i(j,k)$ might include both first order statistics (such as, for example, the mean) and second order statistics (such as, for example, the variance) of the prediction residuals.

Such accuracy maps will identify at what positions a prediction mode i does well and at what positions it performs poorly. Typically, the accuracy of prediction decreases as the samples selected by the mode are farther away from the position to be predicted. For example, the accuracy of horizontal prediction at the first column of the current block is generally much better than the accuracy at the last column.

Similarly, the accuracy of vertical prediction at the first row of the current block is generally much better than the accuracy at the last row.

So configured, these teachings will accommodate identifying two prediction modes i and n whose accuracy maps complement each other. For example, in the case where $A_i(j, k)$ is the energy at position (j,k) resulting from using prediction mode i, these accuracy maps permit identifying prediction modes i and n such that $A_i(j,k)<A_n(j, k)$ at some positions (j, k) and $A_i(j',k')>A_n(j',k')$ at some other positions (j',k'). As one example in these regards, the accuracy map of a horizontal directional mode might complement that of a DC/Planar mode and thereby provide more robust prediction at the columns to the far right. Similarly, the accuracy map of a vertical prediction mode might complement that of the DC mode/planar mode and hence provide more robust prediction at the rows to the far bottom.

As a more specific example in these regards, suppose that mode i is a primary prediction mode having a corresponding accuracy map $A_i$ and let S denote a set of all candidate modes. By one approach the companion prediction mode for i can be determined by, for each mode n in S with accuracy map $A_n$, first determining $C_n=|\{(j,k): A_n(j,k)<A_i(j,k)\}|$ and then identifying the companion prediction mode for i as $$n^* = \arg\max_{n \in S, n \neq i} C_n.$$

These teachings will accommodate a possible asymmetric relationship between a primary prediction mode and its companion prediction mode. For example, $A_n$ in the above process may be calculated only on the blocks for which mode i is selected as the primary prediction mode, and thus may be written as $A_{n|i}$ to emphasize such dependency. In other cases where $A_n$ is calculated on all blocks, such asymmetry might also exist in that if mode n is the companion prediction mode of i might not imply that mode i is the companion mode n. It should be understood that such asymmetry will differ depending on which blocks the accuracy map is calculated upon.

The above processes may be modified if desired to include additional information when determining the companion prediction mode. Examples of additional information are primary prediction modes selected in a common neighborhood, and a subset of S prescribed in the context (e.g. picture header).

These teachings will also accommodate associating a plurality of different corresponding companion prediction modes for a given primary prediction mode when and as appropriate. In such a case, the aforementioned lookup table can again serve to correlate each primary prediction mode with the one or more companion prediction modes that correspond thereto.

It is possible that there are cases where such a companion prediction mode might not exist for a given primary prediction mode. In this case, and continuing with the nomenclature introduced above, mode i may outperform all the other available prediction modes at all positions. To accommodate such circumstances it may be useful to identify a special NULL mode as the companion mode of i for convenience.

At block 103 the encoder process 100 generates a mixed prediction for the block of video data by mixing a prediction formed using the primary prediction mode with a prediction formed using the companion prediction mode as determined above. Mixing is a well-known technique in the literature of data compression. By way of an illustrative example, let X denote a current N×N block to be predicted and suppose there are M available prediction modes indexed by 0, . . . , M−1, respectively. Suppose as well that prediction mode i gives rise to some prediction $P_i$ of X. In this case mixing constitutes a process to integrate a subset of $\{P_0, \ldots, P_{M-1}\}$ into a single prediction P of X.

These teachings will also support the use of weighting when mixing as exemplified by the expression:

$$P(j, k) = \sum_{i=0}^{M-1} w_i(j, k) P_i(j, k)$$

where $0 \leq w_i(j,k) \leq 1$ denotes the weighting factor assigned to $P_i$, (j, k) denotes a position in the N×N block of X, and $$\sum_{i=0}^{M-1} w_i(j, k) = 1 \text{ for any } 0 \leq j, k \leq N-1.$$

As another illustrative example in these regards, a more flexible mixing method makes use of a function f and its inverse $f^{-1}$, that is, $$P(j, k) = f^{-1}\left(\sum_{i=0}^{M-1} w_i(j, k) f(P_i(j, k))\right).$$

An example of $(f, f^{-1})$ is $f(x)=\ln(x)$ $f^{-1}(x)=e^x$.

Mixing can also happen in a different domain by using a unitary transform U (e.g. DCT). For example, left $Q_i$ denote the transform domain representation of $P_i$, i.e., $Q_i=U(P_i)$. Then, $$Q(m, n) = \sum_{i=0}^{M-1} w_i(m, n) Q_i(m, n)$$

where (m, n) denotes a position in the transform domain, and $P=U^{-1}(Q)$, where $U^{-1}$ denotes the inverse transform of U.

These teachings will also facilitate the use of adaptive mixing. For the purposes of an illustrative example suppose that weighting is used in mixing the prediction from a primary prediction mode i and its companion prediction mode n, and at each position (j,k) let $A_i(j,k)$ indicate the average residual energy that results from using mode i. By dynamically maintaining the aforementioned accuracy maps, the factors $w_i(j, k)$ and $w_n(j, k)$ can be adaptively changed.

For example, modes i and n are the primary prediction mode and the companion prediction mode used to reconstruct a current block, respectively. After the block is reconstructed, and as illustrated at block 107 of FIG. 1, these teachings will support automatically updating the companion prediction mode lookup table. To support such updating, the accuracy maps $A_i$ and $A_n$ of modes i and n are updated into $A'_i$ and $N'_n$, respectively. Then at a position (j, k), $w_n(j,k)$ and $w_n(j,k)$ may be updated according to the following rule:

If $A'_i(j,k) > A'_n(j,k)$, $w_i(j,k)=0$ and $w_n(j,k)=1$; otherwise $w_i(j,k)=1$ and $w_n(j,k)=0$.

In cases where fractional factors are allowed, one might prefer that $w_i$ and $w_n$ have smooth surfaces to avoid significant and sudden changes of factors in neighboring positions. This can be achieved by either using a smoothing filter on $w_i$ and $w_n$ or adding a constraint on $w_i(j,k)$ and $w_n(j,k)$ based on the already updated factor in the neighborhood.

In another case, one might prefer that $w_i$ and $w_n$ be described by functions in a known parametric class. That is, that $w_i(j,k)$ be a sample of a parametric function at position (j,k). Since a function in a parametric class can be described by its parameters (sometimes indexed), the update of $w_i$ can be coded as a transition from one parametric function to another.

For example, let $W=\{f_0, f_1, f_2, \ldots\}$ denote an ordered set of parametric functions such that $f_m$, where m is an element of $\{0, 1, 2, \ldots\}$, is a function from N×N to [0, 1]. Here (without losing generality) one can assume 0 j, k<N. An example of a linear $f_m$ is $$f_m(j,k) = a_m + b_m j + c_m k$$

which is parameterized by a three-tuple $(a_m, b_m, c_m)$. Given W, any $w_i$ can then be described by an index m, and the update of $w_i$ can be described by a transition from an index m into another index m'.

By one approach, the mixing parameters are determined in a static fashion, where the parameters are trained offline and stored in both the encoder and the decoder. By another approach, in lieu of the foregoing or in combination therewith, certain special cases can be accommodated. For example, mixing may only happen for some, but not all, pixel positions within the block. Some illustrative, non-limiting examples in these regards include using only a DC mode for a DC position when a DC mode is selected as the primary prediction mode, using only the horizontal mode for pixel positions in the first column when a horizontal prediction is selected as the primary prediction mode, and using only a vertical prediction mode for pixel positions in the first row when a vertical prediction mode is selected as the primary mode.

These teachings will also accommodate adaptive prediction error correction if desired. Consider, for example, the case where the accuracy maps contain first order statistics such as the mean of the prediction error. For the sake of an illustrative example, for a mode i, let $o_i(j, k)$ denote the mean of the prediction error at block position (j,k). In the case of a single prediction mode, for a current block prediction mode i can be used to generate the corresponding prediction $P_i$. Given $o_i$, one can then modify $P_i$ as follows:

$$P'_i(j,k) = P_i(j,k) - o_i(j,k).$$

$P'_i$ can then be used as the prediction of the current block. In other words, one can regard $o_i(j,k)$ as the potential bias of the prediction $P_i$ produced by mode i at position (j, k), and intend to remove that in $P'_i$.

It is possible, of course, that $o_i(j,k)$ might be simply the consequence of quantization. In that case, the adjustment of $P_i$ into $P'_i$ might depend upon the quantization parameter Qp. For example, such an adjustment might only be performed if $|o_i(j,k)|$ is greater than a threshold, say half of the equivalent quantization step size in the spatial domain determined by Qp.

When working as well with a companion prediction mode, for a current block, the prediction mode i can be identified as the primary prediction mode and prediction mode n can be the companion mode. For the sake of this example presume that $w_i$ and $w_n$ are weighting factors used to mix $P_i$ and $P_n$ into the prediction P. Then $$P(j,k) = w_i(j,k)P_i(j,k) + w_n(j,k)P_n(j,k) - w_i(j,k)o_i(j,k) - w_n(j,k)o_n(j,k)$$

Further, similar to the case discussed above, the derivation of P might depend upon the quantization parameter Qp. For example, $P(j,k) = w_i(j,k)P_i(j,k) + w_n(j,k)P_n(j,k)$ if both $|o_i(j,k)| < T$ and $|o_n(j,k)| < T$ $P(j,k) = w_i(j,k)P_i(j,k) + w_n(j,k)P_n(j,k) - w_i(j,k)o_i(j,k)$ if $|o_i(j,k)| \geq T$ and $|o_n(j,k)| < T$ $P(j,k) = w_i(j,k)P_i(j,k) + w_n(j,k)P_n(j,k) - w_n(j,k)o_n(j,k)$ if $|o_i(j,k)| < T$ and $|o_n(j,k)| \geq T$ $P(j,k) = w_i(j,k)P_i(j,k) + w_n(j,k)P_n(j,k) - w_i(j,k)o_i(j,k) - w_n(j,k)o_n(j,k)$ otherwise.

In the foregoing, T is a threshold determined by Qp. For example, T might be equal to half of the equivalent quantization step size in the spatial domain determined by Qp.

By one approach, the foregoing activities can be carried out for a plurality of different primary prediction modes as may be available and/or for a plurality of companion prediction modes as may be available for one or more of the available primary prediction modes. In such a case this process 100 will readily accommodate selecting from amongst the various generated mixed predictions to select a best primary prediction mode/companion prediction mode to employ when encoding a particular block of video data.

By one optional approach, and referring to blocks 104 and 105, such a selection process can rely, at least in part, upon one or more efficacy metrics. In particular, at block 104, the control circuit 201 can determine an efficacy metric for each of the plurality of mixed predictions for the block of video data as were generated pursuant to block 103. These teachings will accommodate a variety of efficacy metrics as may best suit a particular application setting. By one approach, and without intending any limitations in these regards, the efficacy metric can comprise a rate distortion cost.

At block 105 the control circuit 201 can then use those efficacy metrics to identify a selected primary prediction mode for a most efficacious one of the plurality of mixed predictions. By way of example, when the efficacy metric comprises a rate distortion cost, the control circuit 201 can use those rate distortion costs to identify a particular one of the plurality of mixed predictions having a lowest rate distortion cost.

At block 106 the control circuit 201 uses the selected primary prediction mode (and, presumably, a corresponding selected companion prediction mode) to encode the block of video data.

These teachings are highly flexible in practice and will readily accommodate any of a variety of modifications to suit any of a variety of requirements, preferences, and/or application settings. For example, the number of companion prediction modes may be limited to only two (for the whole prediction block or for the entire coding process). As another example, the number of companion prediction modes may dynamically and automatically increase or decrease based on the pixel position within the prediction block. For example, these teachings will accommodate using zero or one companion prediction mode in the top left quadrant, two companion prediction modes in the middle quadrants, and three companion prediction modes in the bottom right quadrant. As yet another example, the number of companion prediction modes may depend on the Prediction Unit (PU) size and/or the pixel position within the prediction block. For example, these teachings will accommodate using more companion prediction modes for 32×32 PU than for 8×8 PU or more companion prediction modes for a pixel position in the furthest right bottom quadrant of the block than in other quadrants.

Figure 3:
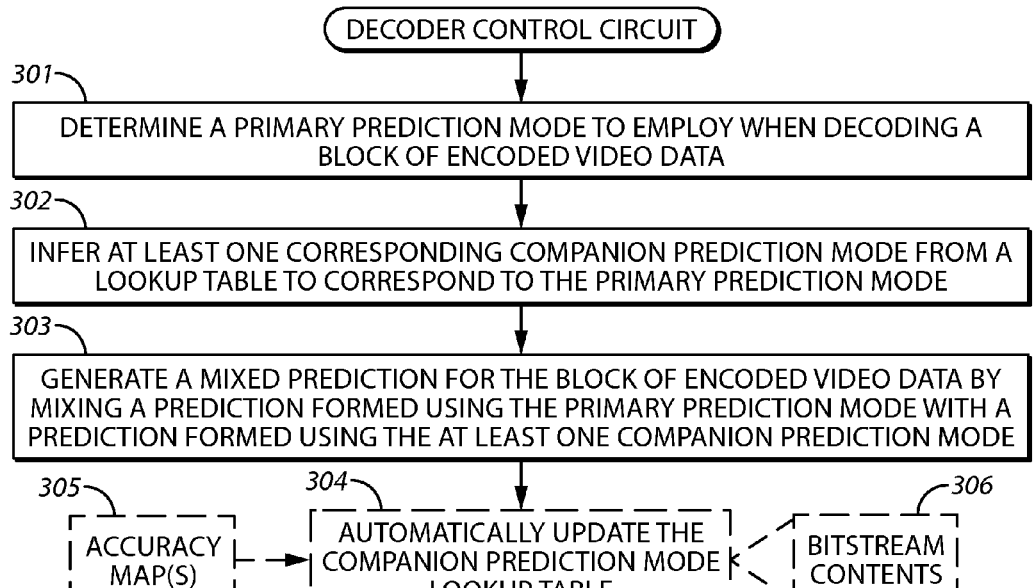
FIG. 3 is a flow diagram in accordance with the disclosure.
Figure 4:
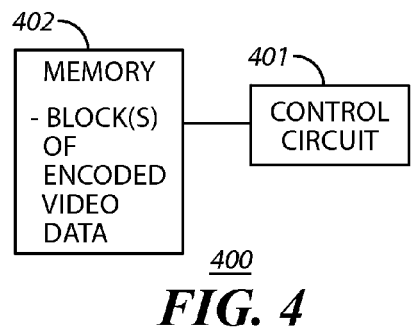
FIG. 4 is a block diagram in accordance with the disclosure.

Referring to FIGS. 3 and 4, a corresponding decoder 400 utilizes a corresponding process 300 to decode blocks of video data that have been encoded as per the foregoing practices. As with the above-described encoder 200, the decoder 400 can comprise a control circuit 401 that again operably couples to a memory 402. In this case, however, the memory 402 stores one or more blocks of encoded video data to be decoded.

At block 301 the decoder control circuit 401 determines a primary prediction mode to employ when decoding a particular block of encoded video data. This determination can be made, for example, using prior art approaches in these regards.

At block 302 the decoder control circuit 401 determines at least one corresponding companion prediction mode from a lookup table to correspond to the primary prediction mode determined above. By one approach this determination comprises inferring the corresponding companion prediction mode from that lookup table. The utilized companion prediction mode can be so inferred, for example, by referring to a companion prediction mode lookup table that includes the aforementioned accuracy maps that identify at what block positions a prediction mode performs well and at what block positions the prediction mode performs poorly. In particular, the inferring of the corresponding companion prediction mode can comprise, at least in part, comparing at least some of the accuracy maps for companion prediction modes with an accuracy map for the primary prediction mode to dynamically determine, at the time of need, the companion prediction mode (or modes) that works best in combination with the already-identified primary prediction mode.

At block 303 the decoder control circuit 401 then generates a mixed prediction for the block of encoded video data by mixing a prediction formed using the above-determined primary prediction mode with a prediction formed using the at least one inferred companion prediction mode.

At block 304, and following the aforementioned generation of the mixed prediction, the decoder control circuit 401 automatically updates the companion prediction mode lookup table. By one approach the control circuit 401 makes this automatic update in response to an instruction in a received bitstream that also includes the aforementioned block of encoded video data. By another approach the control circuit 401 automatically updates the companion prediction mode lookup table based at least in part on a decoded version of the block of encoded video data.

If desired, this automatic updating of the companion prediction mode lookup table can be based on accuracy maps 305 as described above that quantify accuracy of each prediction mode at each position in the block. As one example in these regards, where the lookup tables contain weighting parameters associated to a combination of a primary prediction mode with at least one companion prediction mode and more particularly where the weighting parameters correspond to the combination of an accuracy maps for the primary prediction mode with an accuracy maps for the at least one companion prediction mode, updating the companion prediction mode lookup table can comprise, at least in part, updating the weighting parameters for at least some block positions as a function of a decoded version of the block of encoded video data.

In another example, where the lookup tables consist of entries each of which associates a companion prediction mode to a primary prediction mode, updating the companion prediction mode lookup table can comprise, at least in part, updating at least one entry as a function of a decoded version of the block of encoded video data. Specifically, an entry can be added to associate a new companion prediction mode to a primary prediction mode, removed to dissociate a companion prediction mode from a primary prediction mode, or changed to replace an existing companion prediction mode associated to a primary prediction mode with a new companion prediction mode. Note that such changes to the lookup tables can be based on the accuracy maps updated according to a decoded version of the block of encoded video data.

By another approach the aforementioned automatic update of the companion prediction mode lookup table occurs in response to bitstream content 306 such as an instruction in a received bitstream that includes the block of encoded video data.

The present disclosure may be embodied in other specific forms without departing from its essential characteristics. As but one example in these regards, these teachings will accommodate a conditional use of prediction mixing. For example, the control circuit can selectively employ prediction mixing when also using a so-called transform skip, or when using a block copy approach as a primary and/or companion prediction mode, or as a function of the use or non-use of Residual Differential Pulsed Code Modulation (RDPCM), or as a function of the use or non-use of palette coding if desired.

As another example in these regards, if desired the minimum PU size can be increased when using prediction mixing. For example, a PU size of 8×8 can be used instead of 4×4. In the alternative, all PU sizes can be increased when using prediction mixing. For example, all sizes can be increased by one level (thereby increasing, for example, 32×32 to 64×64).

Prediction mixing can also apply in the case of extended color gamut coding or High Dynamic Range coding. Furthermore, the companion prediction modes can differ if desired for luma and chroma. Such an approach can apply continuously or may be applied only when an extended color gamut is used or when a High Dynamic Range is used. In such a case, and again if desired, when a specific prediction mode is used for either extended color gamut or High Dynamic Range, that specific prediction mode can be used as a primary prediction mode for chroma and luma, used as one of the possible companion prediction modes for both luma and chroma, used as the primary prediction mode for chroma only, used as the only companion mode for chroma only, or some appropriate combination of the foregoing.

The described embodiments are therefore to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An apparatus comprising:
 a memory having stored therein at least one block of video data; and
 a control circuit operably coupled to the memory and configured to:

determine a plurality of possible different primary prediction modes to employ when encoding the block of video data;

for each primary prediction mode of the plurality of possible different primary prediction modes:
  determine, using a companion prediction mode lookup table, a corresponding companion prediction mode to correspond to that primary prediction mode,
  generate a respective mixed prediction for the block of video data by mixing a first respective prediction formed using that primary prediction mode with a second respective prediction formed using the corresponding companion prediction mode of that primary prediction mode, and
  following the generating of the respective mixed prediction for the block of video data, determine an efficacy metric for the respective mixed prediction, and automatically update the companion prediction mode lookup table;

use the efficacy metrics to identify a selected primary prediction mode for a most efficacious one of the plurality of mixed predictions; and use the selected primary prediction mode to encode the block of video data.

2. The apparatus of claim 1 wherein each efficacy metric comprises a rate distortion cost.

3. The apparatus of claim 2 wherein the control circuit is configured to use the efficacy metrics to identify a selected primary prediction mode for a most efficacious one of the plurality of mixed predictions, at least in part, by identifying a particular one of the plurality of mixed predictions having a lowest rate distortion cost.

4. The apparatus of claim 1 wherein the control circuit is configured to determine for each primary prediction mode of the plurality, using the companion prediction mode lookup table, the corresponding companion prediction mode to correspond to that primary prediction mode by inferring the corresponding companion prediction mode from the companion prediction mode lookup table.

5. The apparatus of claim 4 wherein a given one of the companion prediction modes corresponds to a given one of the primary prediction modes as a function, at least in part, of accuracy maps for each of the given companion prediction mode and primary prediction mode, wherein each of the accuracy maps identifies at what block positions a prediction mode performs well.

6. The apparatus of claim 5 wherein the companion prediction mode lookup table includes the accuracy maps, such that the control circuit infers the corresponding companion prediction mode, at least in part, by comparing at least some of the accuracy maps for companion prediction modes with an accuracy map for the primary prediction mode.

7. The apparatus of claim 1 wherein the control circuit is configured to for each primary prediction mode of the plurality of possible different primary prediction modes:
  determine a respective plurality of corresponding companion prediction modes, and
  generate a respective plurality of mixed predictions for the block of video data by mixing a prediction formed using that primary prediction mode with, in turn, a prediction formed using each one of the respective plurality of companion prediction modes.

8. An apparatus comprising:
a memory having stored therein at least one received block of encoded video data;
a control circuit operably coupled to the memory and configured to:
  determine a primary prediction mode to employ when decoding the block of encoded video data;
  infer at least one corresponding companion prediction mode from a companion prediction mode look-up table to correspond to the primary prediction mode;
  generate a mixed prediction for the block of encoded video data by mixing a prediction formed using the primary prediction mode with a prediction formed using the at least one companion prediction mode; and
  following the generating of the mixed prediction for the block of encoded video data, automatically update the companion prediction mode lookup table based on accuracy maps wherein each of the accuracy maps quantifies accuracy of a respective prediction mode at each position in the block and the automatic updating is in response to an instruction in a received bitstream that includes the block of encoded video data.

9. The apparatus of claim 8 wherein the control circuit is configured to automatically update the companion prediction mode lookup table based at least in part on a decoded version of the block of encoded video data.

10. The apparatus of claim 8 wherein the look-up tables contain weighting parameters associated to a combination of a primary prediction mode with at least one companion prediction mode.

11. The apparatus of claim 10 wherein the weighting parameters correspond to the combination of an accuracy map for the primary prediction mode and an accuracy map for the at least one companion prediction mode.

12. The apparatus of claim 10 wherein the control circuit is configured to automatically update the companion prediction mode lookup table by, at least in part, updating the weighting parameters for at least some block positions as a function of a decoded version of the block of encoded video data.

13. The apparatus of claim 10 wherein the weighting parameters are dependent upon block positions.

14. A method comprising:
by a control circuit:
determining a primary prediction mode to employ when at least one of encoding and decoding at least one block of video data;
inferring from a companion prediction mode lookup table, a corresponding companion prediction mode to correspond to the primary prediction mode;
generating a mixed prediction for the at least one block of video data by mixing a prediction formed using the primary prediction mode with a prediction formed using the companion prediction mode;
following the generating of the mixed prediction for the at least one block of video data, automatically updating the companion prediction mode lookup table;
wherein the companion prediction mode lookup table includes accuracy maps and wherein each of the accuracy maps identifies at what block positions a prediction mode performs well, and wherein the inferring of the corresponding companion prediction mode comprises, at least in part, comparing at least some of the accuracy maps for companion prediction modes with an accuracy map for the primary prediction mode.

15. The method of claim 14 wherein updating the companion prediction mode lookup table comprises one or more of updating a weight, changing the companion mode associated with a prediction mode, and adding or removing entries.

16. A method comprising:
    determining a plurality of possible different primary prediction modes to employ when encoding the block of video data;
        for each primary prediction mode of the plurality of possible different primary prediction modes:
            determining, using a companion prediction mode lookup table, a corresponding companion prediction mode to correspond to that primary prediction mode,
            generating a respective mixed prediction for the block of video data by mixing a first respective prediction formed using that primary prediction mode with a second respective prediction formed using the corresponding companion prediction mode of that primary prediction mode, and
            subsequent to the generating of the respective mixed prediction for the block of video data, determining an efficacy metric for the respective mixed prediction, and automatically update the companion prediction mode lookup table;
    using the efficacy metrics to identify a selected primary prediction mode for a most efficacious one of the plurality of mixed predictions; and
    using the selected primary prediction mode to encode the block of video data.

17. A method comprising:
    determining a primary prediction mode to employ when decoding a block of encoded video data;
    inferring at least one corresponding companion prediction mode from a companion prediction mode look-up table to correspond to the primary prediction mode;
    generating a mixed prediction for the block of encoded video data by mixing a prediction formed using the primary prediction mode with a prediction formed using the at least one companion prediction mode; and
    subsequent to the generating of the mixed prediction for the block of encoded video data, automatically update the companion prediction mode lookup table based on accuracy maps wherein each of the accuracy maps quantifies accuracy of a respective prediction mode at each position in the block and the automatic updating is in response to an instruction in a received bitstream that includes the block of encoded video data.

18. An apparatus comprising:
    a memory having stored therein at least one received block of encoded video data; and
    a control circuit operably coupled to the memory and configured to:
        determine a primary prediction mode to employ when at least one of encoding and decoding the at least received one block of video data,
        infer from a companion prediction mode lookup table, a corresponding companion prediction mode to correspond to the primary prediction mode,
        generate a mixed prediction for the at least one block of video data by mixing a prediction formed using the primary prediction mode with a prediction formed using the companion prediction mode, and
        following the generating of the mixed prediction for the at least one block of video data, automatically updating the companion prediction mode lookup table,
    wherein the companion prediction mode lookup table includes accuracy maps and wherein each of the accuracy maps identifies block positions at which a prediction mode performs well, and wherein the inferring of the corresponding companion prediction mode comprises, at least in part, comparing at least some of the accuracy maps for companion prediction modes with an accuracy map for the primary prediction mode.

* * * * *